US010205476B2

(12) United States Patent
Stählin et al.

(10) Patent No.: US 10,205,476 B2
(45) Date of Patent: Feb. 12, 2019

(54) VEHICLE-TO-X COMMUNICATION SYSTEM, VEHICLE, AND METHOD FOR TRANSMITTING VEHICLE-TO-X MESSAGES

(71) Applicants: Continental Teves AG & Co. oHG, Frankfurt (DE); Continental Automotive GmbH, Hannover (DE)

(72) Inventors: Ulrich Stählin, Eschborn (DE); Marc Menzel, Weimar (DE); Richard Owen, Regensburg (DE)

(73) Assignees: Continental Teves AG & Co. oHG, Frankfurt (DE); Continental Automotive GmbH, Hannover (DE)

( * ) Notice: Subject to any disclaimer, the term of this patent is extended or adjusted under 35 U.S.C. 154(b) by 57 days.

(21) Appl. No.: 15/115,340

(22) PCT Filed: Feb. 13, 2015

(86) PCT No.: PCT/EP2015/053061
§ 371 (c)(1),
(2) Date: Jul. 29, 2016

(87) PCT Pub. No.: WO2015/121404
PCT Pub. Date: Aug. 20, 2015

(65) Prior Publication Data
US 2017/0012657 A1   Jan. 12, 2017

(30) Foreign Application Priority Data

Feb. 14, 2014  (DE) ..................... 10 2014 202 781

(51) Int. Cl.
*G08G 1/16* (2006.01)
*H04B 1/3822* (2015.01)

(52) U.S. Cl.
CPC .......... *H04B 1/3822* (2013.01); *G08G 1/161* (2013.01); *G08G 1/162* (2013.01); *G08G 1/163* (2013.01)

(58) Field of Classification Search
CPC ....... H04L 69/14; H04L 67/12; H04L 67/322; G08G 1/161; G08G 1/162; G08G 1/163;
(Continued)

(56) References Cited

U.S. PATENT DOCUMENTS

2002/0163478 A1*  11/2002  Pleva ................. B60K 31/0008
                                                          343/853
2006/0040707 A1*   2/2006  Kish ..................... H04B 7/061
                                                          455/562.1
(Continued)

FOREIGN PATENT DOCUMENTS

DE   102008016311   11/2008
DE   102010064086    6/2012
(Continued)

OTHER PUBLICATIONS

International Search Report and Written Opinion of the International Searching Authority for International Application No. PCT/EP2015/053061 dated May 18, 2015, 7 pages.

*Primary Examiner* — Jianxun Yang
(74) *Attorney, Agent, or Firm* — RatnerPrestia

(57) ABSTRACT

A vehicle-to-x communication system, a vehicle including a vehicle-to-x communication system and a method for transmitting vehicle-to-x messages. Instead of having to diversify transmission as is customary when at least two antennae are used, signals are emitted in a suitably split manner via a first antenna or a second antenna.

18 Claims, 3 Drawing Sheets

(58) Field of Classification Search
CPC ...... G08G 1/00; H04B 7/0604; H04B 7/0877; H04B 7/0691; H04B 1/3822
See application file for complete search history.

(56) References Cited

U.S. PATENT DOCUMENTS

| | | |
|---|---|---|
| 2009/0310608 A1 | 12/2009 | Chen |
| 2011/0098877 A1* | 4/2011 | Stahlin .................. G08G 1/161 701/31.4 |
| 2011/0103273 A1* | 5/2011 | Dutta .................. H04B 7/0608 370/281 |
| 2012/0258705 A1 | 10/2012 | Wisnewski |
| 2013/0120159 A1* | 5/2013 | Stahlin .................. G08G 1/161 340/902 |

FOREIGN PATENT DOCUMENTS

| | | |
|---|---|---|
| JP | 2009048547 | 3/2009 |
| JP | 2009239458 | 10/2009 |
| JP | 2013051515 | 3/2013 |
| JP | 2015002390 | 1/2015 |

* cited by examiner

VEHICLE-TO-X COMMUNICATION SYSTEM, VEHICLE, AND METHOD FOR TRANSMITTING VEHICLE-TO-X MESSAGES

CROSS REFERENCE TO RELATED APPLICATIONS

This application is the U.S. National Phase Application of PCT International Application No. PCT/EP2015/053061, filed Feb. 13, 2015, which claims priority to German Patent Application No. 10 2014 202 781.0, filed Feb. 14, 2014, the contents of such applications being incorporated by reference herein.

FIELD OF THE INVENTION

The invention relates to a vehicle-to-X communication system, a vehicle having such a vehicle-to-X communication system and a method for transmitting vehicle-to-X messages.

BACKGROUND OF THE INVENTION

Vehicle-to-X communication is currently at the research or pre-development stage and is undergoing a standardization process. In particular, vehicle-to-X communication can be based on the standard IEEE 802.11p. Typically, vehicle-to-X communication comprises both vehicle-to-vehicle communication as well as vehicle-to-infrastructure communication. Information can therefore be exchanged both between different vehicles and between infrastructure and vehicles. The former permits, for example, the exchange of position information and speed information between vehicles in order to avoid collisions. The latter permits, for example, the electronic notification of speed limits or traffic information.

In a vehicle-to-X communication system, both the functionality of the vehicle-to-vehicle communication as well as the vehicle-to-infrastructure communication are typically implemented. Possible receivers of messages which are emitted by the vehicle-to-X communication system can be located anywhere around the vehicle. Accordingly, it is basically advantageous if signals are irradiated at an angle of 360° around the vehicle. Ideally, an antenna which correspondingly irradiates on all sides can be used for this.

However, in many vehicles this is not always possible owing to the design or else owing to specific special equipment such as, for example, sun roofs. In such cases, two antennas can be used. In order to reduce the channel load in ranges which are covered by respective irradiation characteristics of both antennas, in such a case a communication system with transmission diversity is used. This ensures that signals are irradiated via both antennas in such a way that despite simultaneous irradiation these signals do not also give rise to problems in regions with overlapping irradiation characteristics. However, communication systems with transmission diversity are very expensive, which significantly increases the cost of the system and prevents widespread use of vehicle-to-X communication becoming established as quickly as possible, which is necessary for the technology to be successful.

SUMMARY OF THE INVENTION

Therefore, an aspect of the invention is to provide a vehicle-to-X communication system which has at least two antennas and can be implemented at relatively low cost. Furthermore, an aspect of the invention is to provide a vehicle having such a vehicle-to-X communication system. Furthermore, it is an aspect of the invention to provide a method for transmitting vehicle-to-X messages, which method can be carried out while using a plurality of antennas and using components that are more cost effective.

An aspect of the invention relates to a vehicle-to-X communication system for a vehicle, having:
a first antenna,
a second antenna, and
a communication unit, which is connected to the first antenna and the second antenna in order to transmit signals via the antennas,
wherein the communication unit is designed to transmit a signal, which is part of a vehicle-to-X communication, selectively via the first antenna or via the second antenna.

By means of the vehicle-to-X communication system according to the invention it is possible to dispense with transmission diversity and nevertheless operate two antennas. Typically, the first antenna and the second antenna irradiate in different directions. For example, the first antenna can irradiate toward the front and the second antenna can irradiate toward the rear. Respective lateral regions are typically covered here by the antennas in such a way that overall complete coverage of the surroundings of the vehicle is achieved. Alternatively, the antennas can also irradiate laterally. For this purpose they can be arranged, for example, in exterior mirrors.

By means of the selective irradiation via the first antenna and the second antenna it is possible to transmit messages in such a way that they do not give rise to an increased channel load. This can also be referred to as pseudo-transmission diversity. The use of expensive communication components with transmission diversity can be dispensed with.

The communication unit or a part thereof can be implemented, for example, as an electronic component. For example, it can be implemented as a microprocessor, microcomputer, application-specific integrated circuit (ASIC) or as a field-programmable controller (FPGA). In particular, it can have processor means and storage means, wherein the storage means store program code, during the execution of which the processor means behave in a defined fashion.

It is to be understood that the vehicle-to-X communication system can basically be operated with any desired number of antennas insofar as at least two antennas are present. For example, it is therefore also possible to use three, four or more antennas. This permits more uniform coverage of the surroundings of the vehicle to be achieved.

The communication unit is preferably designed to transmit the signal either exclusively via the first antenna or exclusively via the second antenna. This formulation can also be considered to be an alternative to the formulation of selective transmission via the first antenna or via the second antenna.

According to one embodiment, the communication unit is designed, when transmitting a signal via the first antenna, not to transmit the signal simultaneously via the second antenna, and when transmitting a signal via the second antenna not to transmit the signal simultaneously via the first antenna. This formulation can also be considered to be an alternative formulation for selective transmission via the first antenna or via the second antenna.

According to an embodiment which is easy to implement, the vehicle-to-X communication system is operated in such a way that irrespective of their type signals are always transmitted alternately via the first antenna and via the second antenna. This can be a reasonable procedure, for example, in the case of messages which specify the current position of the vehicle and serve only to provide general information. These may be, for example, cooperative awareness messages (CAM).

The communication unit is preferably designed to decide, as a function of the type of signals to be transmitted and/or as a function of a traffic situation and/or as a function of driving parameters, whether the signal is transmitted via the first antenna or via the second antenna. This permits better adaptation of the transmission behavior to different parameters and conditions. For example, at a relatively high speed a signal which indicates the current position of the vehicle, in particular in the form of cooperative awareness messages (CAM), can be transmitted more frequently to the front and not so frequently to the rear, since this signal is more of interest for traffic traveling ahead at a high speed. In the case of vehicles with a slow speed, for example trucks on freeways, such signals can more frequently be transmitted to the rear, since the information is more relevant for the traffic to the rear. Messages about accidents or breakdowns are usually of interest exclusively for the traffic to the rear, with the result that said messages can be transmitted for example exclusively via a rear antenna.

According to one preferred embodiment, the communication unit is designed to transmit a signal which is not relevant, or is only of little relevance, for road users behind the vehicle and/or which is relevant only or predominantly for road users in front of the vehicle, exclusively via the first antenna. This is advantageous, in particular, when the first antenna irradiates predominantly toward the front. Such messages may be, for example, position and movement data of a vehicle which is traveling at high speed. Signals which contain, for example, information about a special deployment right of the vehicle can preferably also be irradiated toward the front. Such messages are typically of interest particularly for the traffic traveling ahead.

According to one preferred embodiment, the communication unit is designed to transmit a signal which is not relevant, or is only of little relevance, for road users in front of the vehicle and/or which is relevant only or predominantly for road users behind the vehicle, exclusively via the second antenna. This is advantageous in particular when the second antenna irradiates predominantly toward the rear. For example, information about emergency braking maneuvers or immobilized vehicles in the form of decentralized environmental notification messages (DEMM) can in this way be transmitted exclusively to the rear on freeways, since such information is not relevant for the traffic traveling ahead and is only intended to warn road users traveling behind.

According to one preferred embodiment, the communication unit is designed to transmit a multiplicity of signals which are spaced apart from one another at respective time intervals, according to a transmission pattern, wherein the transmission pattern predefines the sequence in which signals are transmitted via the first antenna or the second antenna. The transmission pattern can be here a sequence of characters which indicates whether a respective signal is transmitted via the first or the second antenna. This procedure permits the transmission behavior in the case of periodically recurring signals to be adapted to specific vehicle parameters or traffic parameters.

In the simplest case, the transmission pattern can be embodied in such a way that the signals are transmitted alternately via the first and the second antenna. As a result, in many cases a good compromise is achieved.

The communication unit is preferably designed to define a transmission pattern as a function of the type of signals to be transmitted and/or as a function of a traffic situation and/or as a function of driving parameters. This permits significantly better adaptation of the transmission behavior to respective vehicle parameters or traffic situations.

For example, the transmission pattern can be defined as a function of the speed. At a high speed, for example signals which indicate the position and speed of the vehicle can be transmitted more frequently to the front, for example such signals can be transmitted with a ratio of 5:1, 4:1 or 3:1 toward the front and toward the rear. At a relatively slow speed, such a ratio can, for example, be inverted, since the signals are then predominantly relevant for road users traveling behind.

If the vehicle carries out an overtaking maneuver, the transmission pattern can be set in such a way that signals relating to the position and speed are transmitted exclusively toward the front, since in this case the warning of the oncoming traffic has highest priority. The transmission pattern can also be set as a function of the position, and therefore, for example, irradiation can occur when approaching intersections in such a way that an intersection assistance system in the vehicles is assisted.

It is to be understood that the respective irradiation characteristics of the antennas are typically taken into account when defining the transmission pattern.

The communication unit is preferably designed to define the transmission pattern in such a way that a proportion of transmissions via the first antenna is higher the less relevant the signals are for road users behind the vehicle and/or the more relevant the signals are for road users in front of the vehicle. This permits simple adaptation of the transmission pattern to the relevance of the signals for the respective road users, in particular if the first antenna irradiates toward the front.

The communication unit is also preferably designed to define the transmission pattern in such a way that a proportion of transmissions via the second antenna is higher the less relevant the signals are for road users in front of the vehicle and/or the more relevant the signals are for road users behind the vehicle. This also permits correspondingly advantageous adaptation of the transmission pattern to the relevance of the signals for the respective road users, in particular if the second antenna radiates toward the rear.

According to one embodiment, the communication unit has a first transmitter unit which is connected to the first antenna, a second transmitter unit which is connected to the second antenna, and a control unit which is connected to the first transmitter unit and to the second transmitter unit. The control unit is designed to actuate the first transmitter unit to transmit a signal via the first antenna and to actuate the second transmitter unit to transmit a signal via the second antenna. The transmitter unit is preferably embodied as a communication chip.

In such a case, the transmitter units are typically not synchronized. This means, in particular, that they are not designed to provide transmission diversity. The cost of the transmitter units can therefore be significantly reduced.

According to a typically alternative embodiment to this, the communication unit has an antenna combiner, a transmitter unit and a control unit, wherein the antenna combiner is connected to the first antenna, the second antenna and the transmitter unit, and wherein the controller is designed to select, by means of the antenna combiner, whether a signal is to be transmitted via the first antenna or via the second antenna.

In this embodiment an antenna combiner can be used instead of a second transmitter unit. The antenna combiner can be embodied, for example, in the form of an SPDT RF switch. The antenna combiner can be actuated, for example, via a GPIO of a control ECU or of a microcontroller. For example, the outputting of a logic 0 can mean that the first antenna is being used, while the outputting of a logic 1 means that the second antenna is being used.

According to one embodiment, the communication unit is designed to transmit signals exclusively via one of the antennas if said communication unit has determined that the transmission via these antennas is sufficient for most of the road users in a current traffic situation and/or given current driving parameters. The communication unit is also preferably designed to transmit signals also via the other antenna if said communication unit has determined that the transmission via just one antenna is no longer sufficient for most of the road users in the current traffic situation and/or given the current driving parameters. In this context, the irradiation characteristic is also typically taken into account. This permits advantageous adaptation of the transmission behavior to traffic situations and driving parameters. Reference is made to the corresponding description above with respect to possible embodiments.

An aspect of the invention also relates to a vehicle having a vehicle-to-X communication system according to an aspect of the invention, wherein the first antenna and the second antenna are arranged on the vehicle in such a way that they irradiate with respective irradiation characteristics.

In the vehicle according to an aspect of the invention, the advantages which are explained above with respect to the vehicle-to-X communication system according to the invention are made usable for a vehicle. In particular, the vehicle can be equipped with a vehicle-to-X communication system even under difficult installation conditions for antennas, without excessively increased costs being incurred therefor. In relation to the vehicle-to-X communication system, it is possible to have recourse to all the embodiments and variants described above. Advantages which have been explained apply correspondingly.

The irradiation characteristics of the first and second antennas advantageously only overlap slightly. The term "slightly" is understood to mean here, in particular, that in overlapping regions of receivers no fault would be perceived if signals were transmitted simultaneously. It can also be understood to mean that regions in which other road users can receive irradiated signals from both antennas are small. However, it is to be understood that an overlap of the irradiation characteristics is not contrary to the method of functioning of the vehicle-to-X communication system according to the invention.

In a typical embodiment, the first antenna is arranged in such a way that it irradiates toward the front, while the second antenna is arranged in such a way that it irradiates toward the rear. Therefore, in particular the procedures explained above, which depend on the relevance of vehicles traveling ahead and vehicles traveling behind can be implemented. However, the two antennas can, for example, also be arranged in such a way that the first antenna irradiates to the left and the second antenna irradiates to the right. This permits, for example, an arrangement of the antennas in the exterior mirrors of the vehicle.

An aspect of the invention also relates to a method for transmitting vehicle-to-X messages which has the following steps:
generating a signal which contains a respective vehicle-to-X message,
determining whether the signal is to be transmitted via a first antenna or a second antenna, and
selective transmission of the signal as a function thereof via the first antenna or the second antenna.

The advantages which have already been explained above with respect to the vehicle-to-X communication system according to the invention are also achieved by means of the method according to the invention. In particular, the transmission behavior can be made dependent on the relevance for road users. It is to be understood that all the features, variants and embodiments which are described above with respect to the vehicle-to-X communication system according to the invention and the vehicle according to the invention can also be applied correspondingly with respect to the method according to the invention. The application of the corresponding described features, variants and embodiments for the method according to the invention therefore forms part of the disclosure of this application. Advantages which have been explained apply correspondingly.

Vehicle-to-X messages are understood within the sense of the invention also to be messages which are exchanged between a vehicle and a remote control system. Such a remote control system may be used, for example, to activate and/or to control an automated parking process. In this context, antennas of the vehicle, for example the first antenna and the second antenna, can be actuated in such a way that, depending on parameters such as, for example, the route being traveled on and/or the steering locks used and/or the movement of the remote control system, in each case that antenna which transmits the message or a signal containing said message has the irradiation characteristic which is better in the direction of the remote control system. Communication technologies which are typically conceived for the direct exchange of data between two devices, for example WLAN according to 802.11, Bluetooth, ZigBee, LTE-direct or other communication technologies, can be used as the communication technology here or else in other cases.

BRIEF DESCRIPTION OF THE DRAWINGS

Further features and advantages will be inferred by a person skilled in the art from the exemplary embodiments described below with respect to the appended drawing, in which.

DETAILED DESCRIPTION OF THE PREFERRED EMBODIMENTS

Figure 1:
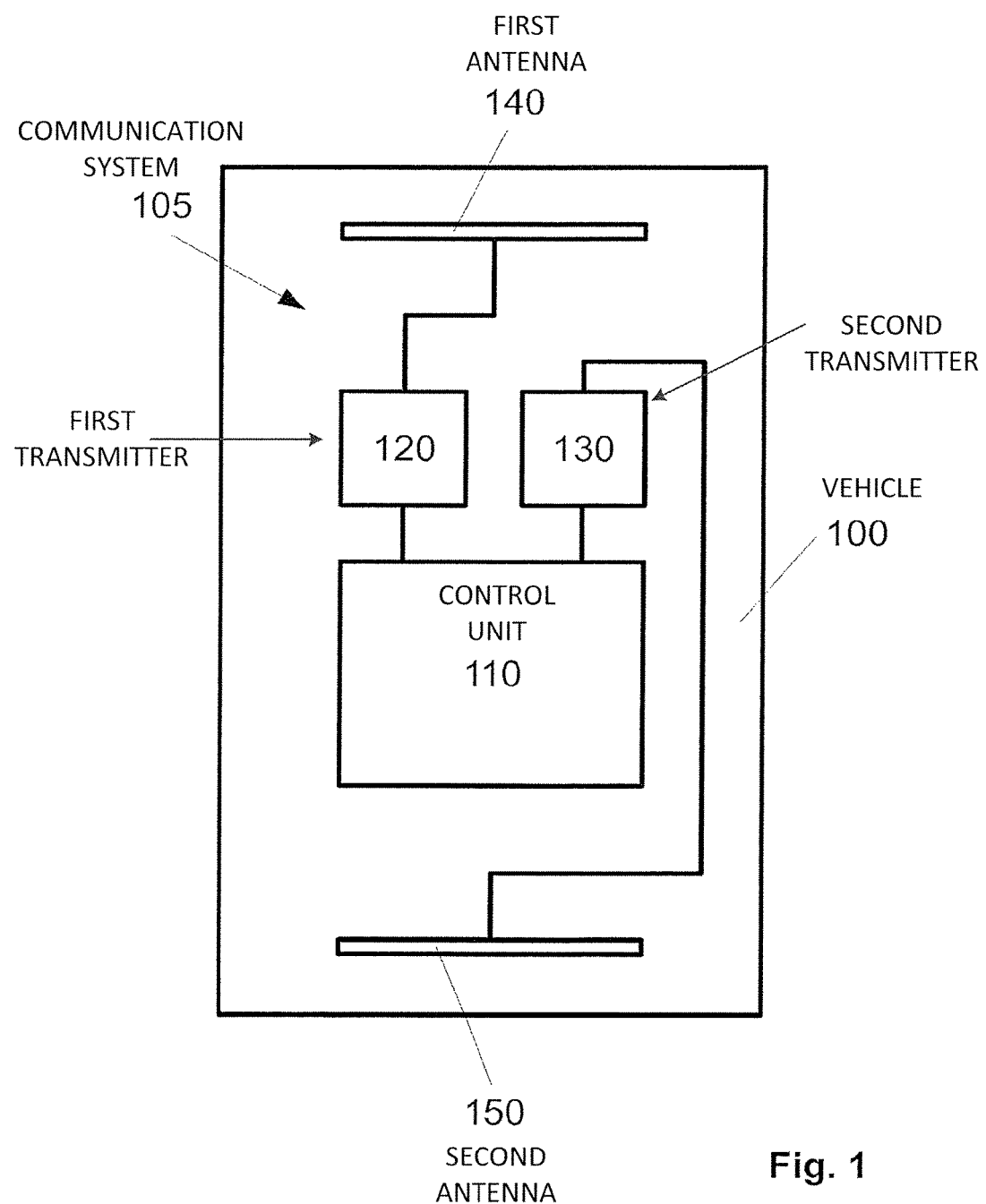
FIG. 1 shows a vehicle having a vehicle-to-X communication system according to a first exemplary embodiment.

FIG. 1 is a schematic view of a vehicle 100. The vehicle 100 has a vehicle-to-X communication system 105 which is also illustrated schematically.

The vehicle-to-X communication system 105 has a control unit 110, a first transmitter unit 120, a second transmitter unit 130, a first antenna 140 and a second antenna 150. The control unit 110 is connected to the first transmitter unit 120 and the second transmitter unit 130. The first transmitter unit 120 is connected to the first antenna 140. The second transmitter unit 130 is connected to the second antenna 150. The control unit 110, the first transmitter unit 120 and the second transmitter unit 130 together form a communication unit.

The described arrangement makes it possible for the control unit 110 to emit signals via the first antenna 140 by means of the first transmitter unit 120. Likewise it permits the control unit 110 to emit signals via the second antenna 150 by means of the second transmitter unit 130. The control unit 100 can therefore select via which antenna 140, 150 a signal is to be transmitted by actuating the correspondingly associated transmitter unit 120, 130.

The first antenna 140 is designed to irradiate essentially toward the front. The second antenna 150 is designed to irradiate essentially toward the rear. The respective lateral regions are respectively covered by the two antennas 140, 150.

The control unit 110 is designed, in particular, to emit signals periodically on a continuous basis, said signals containing the current position and vehicle speed of the vehicle 100. While such information is basically relevant for all surrounding road users, the relevance varies for road users located in front of the vehicle and road users located behind the vehicle with the speed and with the driving situation.

If the vehicle 100 has a speed which is slow compared to the usually surrounding traffic, for example in the case of a truck on a freeway, the signals are mainly relevant for the traffic to the rear.

The control unit 110 is designed to transmit the signals in this case in such a way that three signals are always transmitted via the second antenna 150 and then one signal is transmitted via the first antenna 140. Therefore, overall three times as many signals are transmitted via the second antenna 150 as via the first antenna 140. If, on the other hand, the vehicle is traveling at a high speed on the freeway, the signals are mainly of interest for the traffic traveling ahead. The control unit 110 is designed always to transmit in this case three signals via the first antenna 140 and then one signal via the second antenna 150. This suitably takes into account the relevance of the signals for the surrounding road users. It is possible to dispense with an expensive provision of transmission diversity, which significantly lowers the cost of the system. Instead of the ratio of 3:1, other ratios can also be selected, for example 5:1 or 7:2, wherein the ratio ideally depends on the speed at which the vehicle is traveling.

If the vehicle 100 has an accident or a breakdown or initiates an emergency braking manoeuver, messages which indicate this are transmitted, for example, exclusively via the second antenna 150. This allows for the fact that such messages are exclusively relevant for the traffic to the rear, in order to avoid a collision. If the vehicle 100 has special deployment rights, this information is transmitted exclusively via the first antenna 140, since this information is of interest, for example, exclusively for the traffic traveling ahead.

Figure 2:
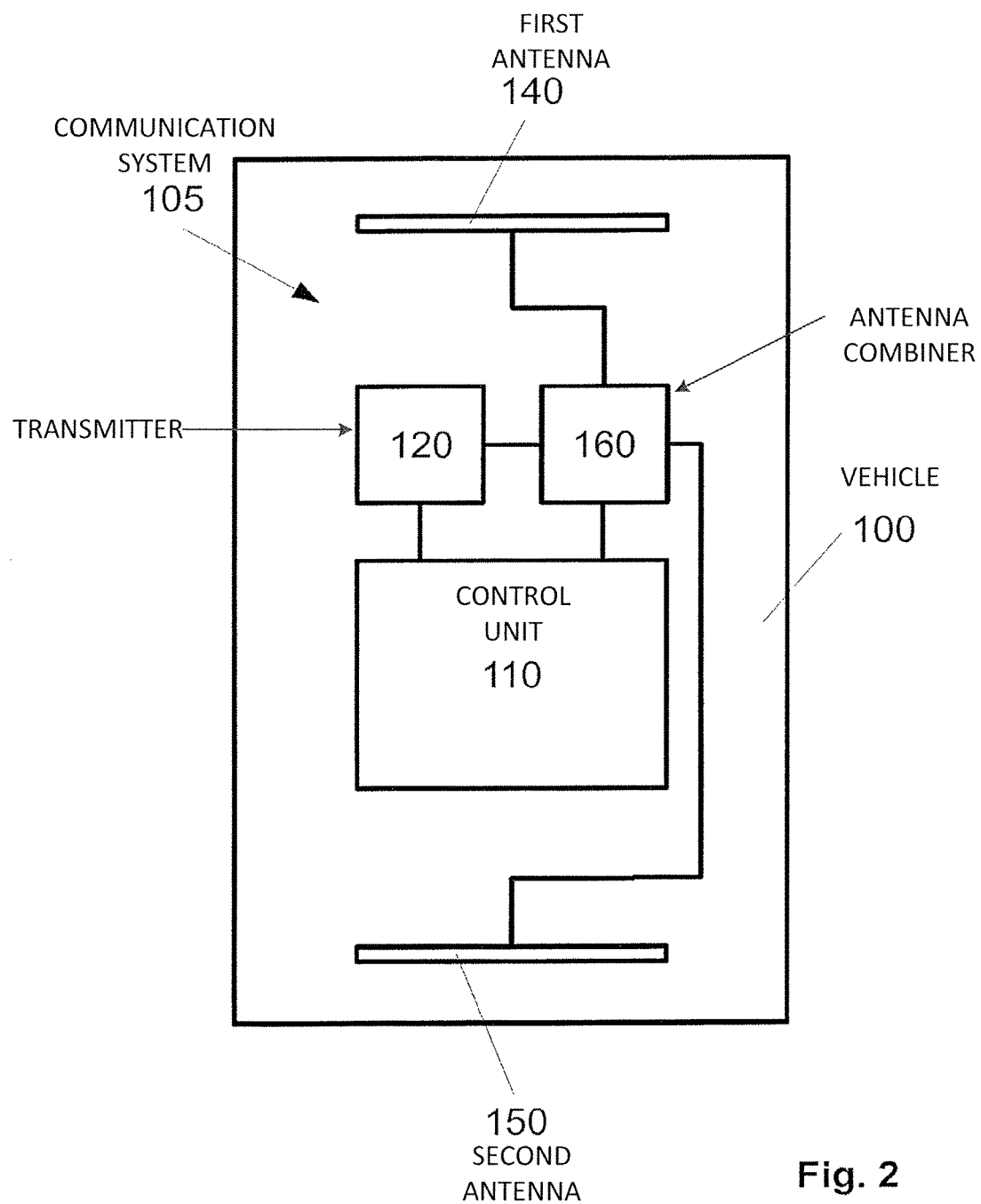
FIG. 2 shows a vehicle having a vehicle-to-X communication system according to a second exemplary embodiment.

FIG. 2 shows a vehicle 100 having a vehicle-to-X communication system 105 according to a second exemplary embodiment. The vehicle-to-X communication system 105 according to the second exemplary embodiment is constructed in a similar way to the vehicle-to-X communication system 105 according to the first exemplary embodiment. However, in contrast to this, two transmitter units 120, 130 are not provided but instead merely one transmitter unit 120 is provided which is connected to the control unit 110. Furthermore, an antenna combiner 160 is provided which is connected to the control unit 110, the transmitter unit 120 and to the two antennas 140, 150. The communication unit is formed in the second exemplary embodiment by means of the control unit 110, the transmitter unit 120 and the antenna combiner 160.

In the case of the second exemplary embodiment, the control unit 110 basically transmits signals via the transmitter unit 120 and selects, by means of the antenna combiner 160, via which of the two antennas 140, 150 transmission is to take place. This permits a second transmitter unit 130 to be dispensed with. The further functionality is identical to the vehicle-to-X communication system 105 according to the first exemplary embodiment, with the result that the description above is referred to.

A further description of features which can be relevant for the invention is given below. It is to be understood that individual features in this description can be assigned to features of the previous description on the basis of their functionality or on the basis of other criteria, but do not have to be. All the features described below can be combined with all the features described above in any desired combinations and secondary combinations. The disclosure of this application also comprises, in particular, that selection, or those combinations or secondary combinations of features described above, wherein one or more of the features described below are exempted from protection explicitly. The following embodiments can also be understood to be an independent description of an invention or a specification of the invention which has already been described above.

In the prior art, vehicle-to-X communication systems which are designed both to transmit traffic-related data and various service data items such as, for example, entertainment applications, are already known. The vehicle-to-X communication is based here both on the exchange of data between vehicles (vehicle-to-vehicle communication) as well as on the exchange of data between vehicles and infrastructure devices (vehicle-to-infrastructure communication). This exchange of data can be based here, for example, on the WLAN standard IEEE 802.11p, which is currently in the pre-development stage. Furthermore, owing to the stringent requirements of the reliability of the vehicle-to-X communication it is known, inter alia, to have recourse to what is referred to as antenna diversity or diversity for the transmission and reception of vehicle-to-X messages. In this context, a plurality of antennas are used for the synchronous transmission and reception of vehicle-to-X messages and generally for transmitting or receiving information which can be transmitted in a wireless fashion.

In the case of a vehicle-to-X communication system, irradiation of the message through 360° around the vehicle is basically desirable or necessary. Ideally, an antenna can be used for this which correspondingly radiates toward all sides. However, this is not always possible for structural reasons, with the result that in some cases two antennas have to be used. In order, nevertheless, to achieve acceptable irradiation of the transmitted messages, what is referred to as transmission diversity is used in the prior art.

Communication chips for vehicle-to-X communication systems with transmission diversity are, however, expensive and therefore, owing to the prevailing cost pressure, are usually used only when it is unavoidably necessary. Therefore, the typical system configuration of a vehicle-to-X communication system provides a communication chip with just one connection possibility for an antenna. If a second communication chip is simply added to this system configuration for a two-antenna solution, the two communication chips are not synchronized and therefore no transmission diversity is possible. Transmission via both communication chips would mean doubling of the channel load in the overlapping regions of the irradiation characteristic of the two antennas and therefore load the channel too heavily.

According to an aspect of the invention, it is therefore preferably proposed to use two unsynchronized communication chips which each actuate one antenna. The two antennas particularly preferably have here irradiation characteristics which do not overlap or only overlap very slightly. This is particularly preferred according to the invention but not necessary for the implementation of the invention.

Any vehicle-to-X message is then preferably transmitted either via the one communication chip or via the other, but not via both.

In a preferred standard case, vehicle-to-X messages are alternately transmitted via the communication chips so that each "side" of the vehicle "sees" the messages with half the repetition rate, or the vehicle-to-X messages from each antenna are irradiated by means of half the repetition rate. However, it may be the case here that important messages do not arrive quickly enough at a receiver. It is therefore preferred to adapt this statistical transmission pattern dynamically by means of the following criteria, which can be applied individually or in any desired combination: messages which are relevant for only one transmission direction are also transmitted only via the corresponding communication chip. Therefore, what is referred to as "DENM" for an emergency braking manoeuver is of interest only for the traffic to the rear and therefore also only needs to be transmitted via this communication chip. It is the same with the warning about an immobilized vehicle. On the basis of the current driving situation it is estimated in which direction messages tend to be needed and transmission is correspondingly carried out more frequently in that direction. Therefore, in the case of high speed travel on the freeway it can be assumed that vehicles tend to be overtaken and therefore the vehicle's own messages tend to be relevant for the vehicles in front of the vehicle in question. Therefore, what is referred to as "CAM" is transmitted more frequently to the front than to the rear, for example with a ratio of 4:1. In the case of a lorry on the freeway, the situation is, however, different; here, the vehicles preferably receive information from the rear, and therefore transmission tends to take place toward the rear, for example with a ratio of 3:1.

In the case of an overtaking procedure it is important that the vehicles in the oncoming traffic receive information, for which reason transmission takes place in particular toward the front, for example with a ratio of 5:1.

The emission can also be adapted as a function of map material. Therefore, in the vicinity of intersections the support of an intersection assistance system is important, for which reason transmission preferably takes place toward the front.

The distribution of the communication between the two communication chips or antennas can be made additionally dependent on the actual irradiation characteristic of the antennas. If given the current driving situation or speed the irradiation by means of one of the antennas is considered to be sufficient for the road users which are most at risk, i.e. the vehicles in the surroundings, the transmission via the second antenna can be dispensed with completely. The switching over would be used only when, given the current driving situation or speed, the irradiation characteristic were to be considered to be no longer sufficient to reliably reach the road users which are most at risk.

Instead of using two communication chips, an individual communication chip, to which what is referred to as an "SPDT RF switch" is connected, can also be used. Then, the two antennas are connected to this switch. The actuation of the two antennas then does not take place via the communication chip but rather by switching over the RF switch. The latter can be actuated, for example, by what is referred to as a "GPIO" of a control ECU or a microcontroller. A logic "0" can then mean, for example, that the front antenna is actuated and a logic "1" can mean, for example, that the rear antenna is actuated.

Furthermore, it is preferred that not only two communication chips and/or two antennas are used but rather a multiplicity of communication chips and/or antennas.

It is preferably also provided that the vehicle-to-X communication system is arranged in a vehicle and is used in the vehicle, wherein the antennas are arranged on the vehicle in such a way that the smallest possible overlap of the irradiation characteristics occurs.

An aspect of the invention therefore presents a possible way of making the system architecture of a corresponding product family significantly simpler by simple integration of one or more additional communication chips or antennas or RF switches, and, in particular, of making the basic variant significantly more favorable than would be the case when using diversity-capable communication chips.

The design can, under certain circumstances, be made even simpler if only the changeover switch is used.

Figure 3:
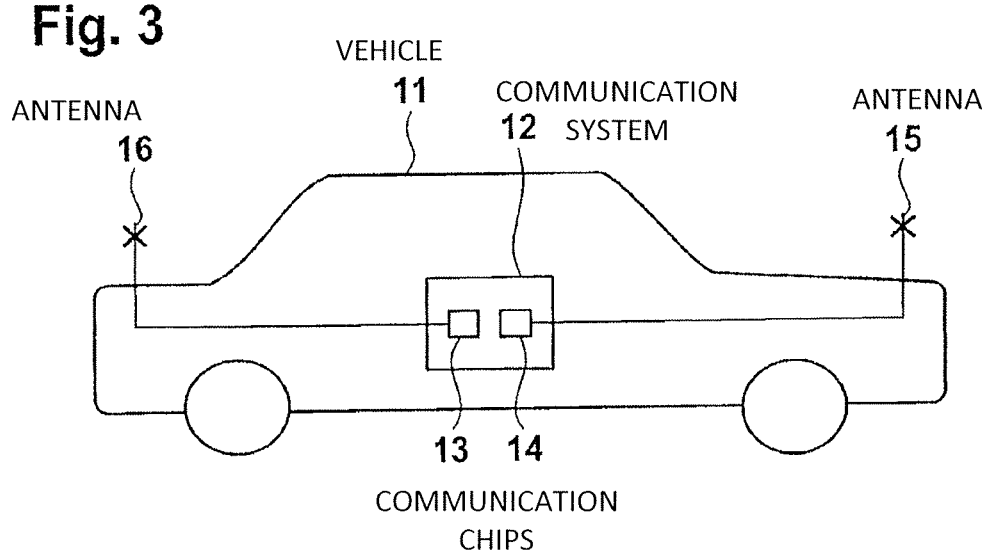
FIG. 3 shows a vehicle having a vehicle-to-X communication system which comprises two communication chips and two antennas.

FIG. 3 shows a vehicle 11 having a vehicle-to-X communication system 12. The vehicle-to-X communication system comprises two communication chips 13 and 14 which are independent of one another and which are, in particular, not synchronized. Each of the communication chips 13 and 14 is assigned one of the antennas 15 and 16. Antenna 15 is arranged here on the vehicle 11 in such a way that it irradiates mainly in the direction of travel of the vehicle 11 and irradiates partially toward both sides of the vehicle 11. On the other hand, the antenna 16 is arranged on the vehicle 11 in such a way that it irradiates mainly counter to the direction of travel of the vehicle 11 and irradiates partially toward both sides of the vehicle 11. Therefore, a small overlap is produced in the irradiation characteristics of antennas 15 and 16 only to the left and to the right of the vehicle 11. When a vehicle-to-X message is transmitted, the vehicle-to-X communication system 12 selects, as a function of the situation and according to predefined selection criteria, which of the antennas 15 and 16 will be used to transmit the respective vehicle-to-X message.

Figure 4:
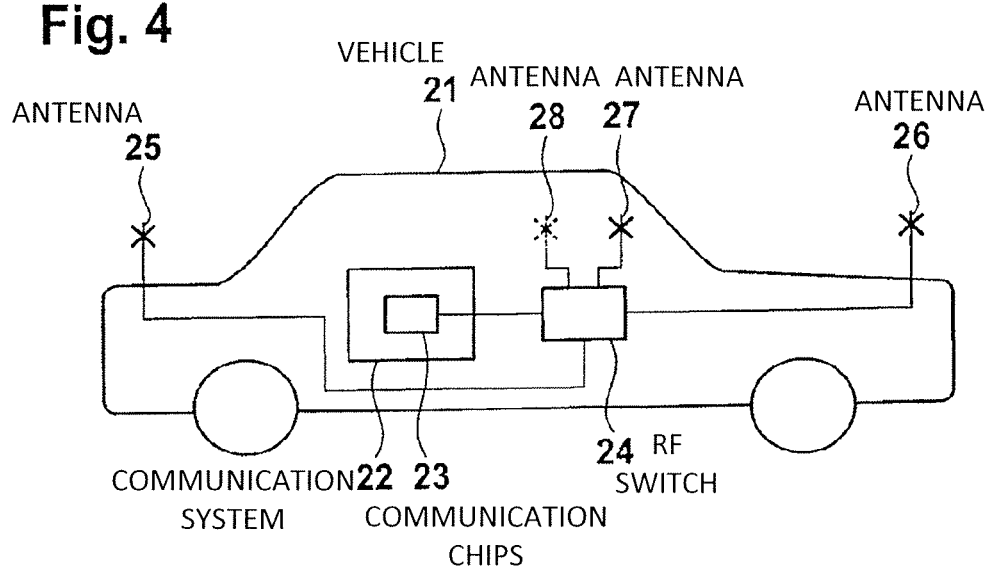
FIG. 4 shows a vehicle having a vehicle-to-X communication system which comprises a communication chip, four antennas and an RF switch.

FIG. 4 shows the vehicle 21 with the vehicle-to-X communication system 22. The vehicle-to-X communication system comprises communication chips 23 and the RF switch 24 or an antenna combiner. Arranged on the vehicle 21 and electrically connected to the RF switch 24 are also antennas 25, 26, 27 and 28. The antenna 28 is arranged on the side of the vehicle 21 lying opposite the viewer in FIG. 4, and is illustrated by dashed lines in order to clarify this fact. The antennas 25, 26, 27 and 28 also have, owing to their design, an irradiation characteristic or directional characteristic which brings about main irradiation at an angle of less than 180°. The antenna 25 is arranged and oriented on the vehicle 21 in such a way that it irradiates mainly counter to the direction of travel of the vehicle 21. The antenna 26 is arranged and oriented on the vehicle 21 in such a way that it irradiates mainly in the direction of travel of the vehicle 21. The antenna 27 is arranged and oriented on the vehicle 21 in such a way that it irradiates mainly toward a viewer in FIG. 4. The antenna 28 is arranged and oriented on the vehicle 21 in such a way that it irradiates mainly away from a viewer in FIG. 4. When a vehicle-to-X message is transmitted, the vehicle-to-X communication system 22 actuates, as a function of the situation and according to predefined selection criteria, the RF switch 24 in such a way that the respective vehicle-to-X message is transmitted with the respectively selected antenna 25, 26, 27 or 28.

A system enumeration of a number of aspects will be given below. This does not involve the patent claims of this application, but it is understood that the following enumeration can be used as patent claims.

1. A vehicle-to-X communication system for transmitting a vehicle-to-X message in a selected spatial direction,
wherein the vehicle-to-X communication system comprises a communication chip and at least two antennas,
characterized
in that the vehicle-to-X communication system comprises at least one further communication chip and/or at least one RF switch.

2. The system as claimed in aspect 1,
characterized
in that the communication chips are not synchronized and each of the communication chips is not diversity-capable.

3. The system as claimed in at least one of aspects 1 and 2,
characterized
in that the antennas irradiate in different spatial directions.

4. The system as claimed in at least one of aspects 1 to 3,
characterized
in that each communication chip is assigned an antenna.

5. The system as claimed in at least one of aspects 1 to 4,
characterized
in that the RF switch is assigned to the single communication chip of the system, and all of the antennas of the system are assigned to the RF chip.

6. The system as claimed in at least one of aspects 1 to 5,
characterized
in that each of the antennas or some of the antennas have a directional characteristic.

7. The system as claimed in at least one of aspects 1 to 6,
characterized
in that the irradiation characteristics of the antennas essentially do not overlap.

8. A method for transmitting a vehicle-to-X message in a selected spatial direction,
wherein the vehicle-to-X message is transmitted by a vehicle-to-X communication system as claimed in at least one of aspects 1 to 7,
characterized
in that at least one antenna for transmitting the vehicle-to-X message is selected as a function of the situation.

9. The use of the vehicle-to-X communication system as claimed in at least one of aspects 1 to 7 in a vehicle, in particular in a motor vehicle.

The claims which are associated with the application do not constitute a renunciation of the achievement of wide-ranging protection.

Insofar as it is established in the course of the method that a feature or a group of features is not necessarily required, the applicant is already now aiming at a formulation of at least one independent claim which no longer has the feature or the group of features. This may involve, for example, a secondary combination of a claim which is present on the application date or a secondary combination, restricted by further features, of a claim which is present on the application date. Such claims or combinations of features which are to be newly formulated are to be understood as also being covered by the disclosure of this application.

It is also to be noted that configurations, features and variants of the invention which are described in the various embodiments or exemplary embodiments and/or shown in the figures can be combined with one another as desired. Individual features or a number of features can be combined with one another as desired in an exchangeable fashion. Combinations of features which arise from this are to be understood as also being covered by the disclosure of this application.

Back-references in dependent claims are not to be understood as being a renunciation of the achievement of independent protection for a subject matter for the features of the dependent claims with back references. These features can also be combined as desired with other features.

Features which are disclosed only in the description or features which are disclosed in the description or in a claim only in conjunction with other features can basically be of independent significance which is essential to the invention. They can therefore also be adopted individually into claims for the delimitation from the prior art.

The invention claimed is:

1. A vehicle-to-X communication system for a vehicle having:
   a first antenna configured to emit data signals towards a front of the vehicle,
   second antenna configured to emit data signals towards a rear of the vehicle, and
   a communication unit, which is connected to the first antenna and the second antenna in order to transmit the data signals via the antennas,
   wherein the communication unit is designed to:
      transmit a higher proportion of the data signals via the first antenna than via the second antenna when the data is determined to be more relevant to road users in front of the vehicle than to road users behind the vehicle in response to a speed of the vehicle being greater than a first threshold, and
      transmit a higher proportion of the data signals via the second antenna than via the first antenna when the data is determined to be more relevant to the road users behind the vehicle than to the road users in front of the vehicle in response to at least one of: the speed of the vehicle being less than a second threshold, the data being directed to an incident on the road that the vehicle is traveling on, or braking of the vehicle,
      wherein the first threshold is the same as the second threshold, or the first threshold is different than the second threshold.

2. The vehicle-to-X communication system as claimed in claim 1, wherein
   the communication unit is designed to transmit the signal either exclusively via the first antenna or exclusively via the second antenna.

3. The vehicle-to-X communication system as claimed in claim 1, wherein
   the communication unit is designed, when transmitting a signal via the first antenna, not to transmit the signal simultaneously via the second antenna, and when transmitting a signal via the second antenna not to transmit the signal simultaneously via the first antenna.

4. The vehicle-to-X communication system as claimed in claim 1, wherein the communication unit is designed to decide, as a function of at least one of the type of signals to be transmitted, a traffic situation, and driving parameters, whether the signal is transmitted via the first antenna or via the second antenna.

5. The vehicle-to-X communication system as claimed in claim 1, wherein
the communication unit is designed to transmit a signal which is not relevant, or is only of little relevance, for road users behind the vehicle and/or which is relevant only or predominantly for road users in front of the vehicle, exclusively via the first antenna.

6. The vehicle-to-X communication system as claimed in claim 1, wherein
the communication unit is designed to transmit a signal which is not relevant, or is only of little relevance, for road users in front of the vehicle and/or which is relevant only or predominantly for road users behind the vehicle, exclusively via the second antenna.

7. The vehicle-to-X communication system as claimed in claim 1, wherein
the communication unit is designed to transmit a multiplicity of signals which are spaced apart from one another at respective time intervals, according to a transmission pattern, and
wherein the transmission pattern predefines a sequence in which signals are transmitted via the first antenna or the second antenna.

8. The vehicle-to-X communication system as claimed in claim 7, wherein
the communication unit is designed to define a transmission pattern as a function of at least one of the type of signals to be transmitted, a traffic situation, and driving parameters.

9. The vehicle-to-X communication system as claimed in claim 8, wherein
the communication unit is designed to define the transmission pattern in such a way that a proportion of transmissions via the first antenna is higher than the transmissions via the second antenna when the signals for road users behind the vehicle are less relevant and/or when the signals for road users in front of the vehicle are more relevant.

10. The vehicle-to-X communication system as claimed in claim 8, wherein
the communication unit is designed to define the transmission pattern in such a way that a proportion of transmissions via the second antenna is higher than the transmissions via the first antenna when the signals for road users in front of the vehicle are less relevant and/or when the signals for road users behind the vehicle are more relevant.

11. The vehicle-to-X communication system as claimed in claim 8, wherein
the communication unit is designed to define the transmission pattern in such a way that a proportion of transmissions via the second antenna is higher than the transmissions via the first antenna as the signals for road users in front of the vehicle are less relevant and/or as the signals for road users behind the vehicle are more relevant.

12. The vehicle-to-X communication system as claimed in claim 1, wherein the communication unit comprises:
a first transmitter unit which is connected to the first antenna,
a second transmitter unit which is connected to the second antenna, and
a control unit which is connected to the first transmitter unit and to the second transmitter unit,
wherein the control unit is designed to actuate the first transmitter unit to transmit a signal via the first antenna, and to actuate the second transmitter unit to transmit a signal via the second antenna.

13. The vehicle-to-X communication system as claimed in claim 1, wherein,
the communication unit has an antenna combiner, a transmitter unit and a control unit,
wherein the antenna combiner is connected to the first antenna, the second antenna and the transmitter unit, and
wherein the control unit is designed to select, by the antenna combiner, whether a signal is to be transmitted via the first antenna or via the second antenna.

14. The vehicle-to-X communication system as claimed in claim 1, wherein
the communication unit is designed to transmit signals exclusively via one of the antennas if the communication unit has determined that the transmission via these antennas is sufficient for most of the road users in a current traffic situation and/or given current driving parameters, and
the communication unit is designed to transmit signals also via the other antenna if the communication unit has determined that the transmission via just one antenna is no longer sufficient for most of the road users in the current traffic situation and/or given the current driving parameters.

15. A vehicle having a vehicle-to-X communication system as claimed in claim 1,
wherein the first antenna and the second antenna are arranged on the vehicle in such a way that they irradiate with respective irradiation characteristics,
wherein the irradiation characteristics do not overlap or only overlap slightly.

16. The vehicle-to-X communication system as claimed in claim 1,
wherein the communication unit is designed to:
transmit the data signals via the first antenna and the second antenna at a first ratio when the data is more relevant to road users in front of the vehicle than to road users behind the vehicle, and
transmit the data signals via the second antenna and the first antenna at a second ratio when the data is more relevant to the road users behind the vehicle than to the road users in front of the vehicle,
wherein the first ratio and the second ratio are determined based on at least one of a direction of travel or a speed of the vehicle.

17. A method for transmitting vehicle-to-X messages comprising:
generating data signals which contain respective vehicle-to-X messages,
determining whether the data signals are to be transmitted via a first antenna of a vehicle configured to emit the data signals towards a front of the vehicle or a second antenna of the vehicle configured to emit the data signals towards a rear of the vehicle, and
selectively transmitting the data signals as a function thereof via the first antenna or the second antenna, by:
transmitting a higher proportion of the data signals via the first antenna than via the second antenna when the data is determined to be more relevant to road users in front of the vehicle than to road users behind the vehicle in response to a speed of the vehicle being greater than a first threshold, and transmitting a higher proportion of the data signals via the second antenna than via the first antenna when the data is determined to be more relevant to the road users behind the vehicle than to the road users in front of the vehicle in response to at least one of: the speed of the vehicle being less than a second threshold, the data being directed to an incident on the road that the vehicle is traveling on, or braking of the vehicle, wherein the first threshold is the same as the second threshold, or the first threshold is different than the second threshold.

18. A vehicle-to-X communication system for a vehicle having:

a first antenna configured to emit data signals towards a front of the vehicle, second antenna configured to emit data signals towards a rear of the vehicle, and a communication unit, which is connected to the first antenna and the second antenna in order to transmit the data signals via the antennas, wherein the communication unit is designed to:

transmit a higher proportion of the data signals via the first antenna than via the second antenna when the data is determined to be more relevant to road users in front of the vehicle than to road users behind the vehicle, and transmit a higher proportion of the data signals via the second antenna than via the first antenna when the data is determined to be more relevant to the road users behind the vehicle than to the road users in front of the vehicle, wherein the communication unit is designed to transmit a multiplicity of signals which are spaced apart from one another at respective time intervals, according to a transmission pattern, wherein the transmission pattern predefines a sequence in which signals are transmitted via the first antenna or the second antenna, and wherein the communication unit is designed to define a transmission pattern as a function of at least one of the type of signals to be transmitted, a traffic situation, and driving parameters.

* * * * *